(12) United States Patent
Dial

(10) Patent No.: US 10,765,098 B2
(45) Date of Patent: Sep. 8, 2020

(54) TUNGSTEN FISHING SINKER AND METHOD THEREOF

(71) Applicant: Ray Steven Dial, Lehigh Acres, FL (US)

(72) Inventor: Ray Steven Dial, Lehigh Acres, FL (US)

(*) Notice: Subject to any disclaimer, the term of this patent is extended or adjusted under 35 U.S.C. 154(b) by 389 days.

(21) Appl. No.: 15/905,787

(22) Filed: Feb. 26, 2018

(65) Prior Publication Data

US 2019/0037823 A1 Feb. 7, 2019

Related U.S. Application Data

(60) Provisional application No. 62/541,754, filed on Aug. 6, 2017.

(51) Int. Cl.
*A01K 95/00* (2006.01)
*C22C 27/04* (2006.01)
*C22F 1/18* (2006.01)

(52) U.S. Cl.
CPC ............ *A01K 95/005* (2013.01); *C22C 27/04* (2013.01); *C22F 1/18* (2013.01)

(58) Field of Classification Search
CPC ...... A01K 95/00; A01K 95/005; C22C 27/04; C22F 1/18
See application file for complete search history.

(56) References Cited

U.S. PATENT DOCUMENTS

| | | | | |
|---|---|---|---|---|
| 2,573,981 A * | 11/1951 | Nelson | A01K 95/00 43/43.12 |
| 2,577,549 A * | 12/1951 | Vice | A01K 95/00 43/44.97 |
| 2,983,068 A * | 5/1961 | Grayson | A01K 95/00 43/44.89 |
| 3,077,049 A * | 2/1963 | Ward | A01K 95/00 43/44.9 |
| 3,137,962 A * | 6/1964 | Linley, Sr. | A01K 95/00 43/43.13 |
| 3,180,051 A * | 4/1965 | Freeman | A01K 95/00 43/43.12 |
| 3,608,230 A * | 9/1971 | Hribar | A01K 95/00 43/44.89 |
| 3,803,749 A * | 4/1974 | Boyum | A01K 95/00 43/44.9 |
| 4,649,663 A * | 3/1987 | Strickland | A01K 95/00 43/44.9 |
| 4,837,966 A * | 6/1989 | Bethel | A01K 95/00 43/43.1 |
| 5,031,351 A * | 7/1991 | Rogel | A01K 95/00 43/43.12 |
| 5,157,860 A * | 10/1992 | Clark | A01K 95/00 43/43.12 |
| 5,428,920 A * | 7/1995 | Levin | A01K 93/00 43/44.89 |
| 5,435,095 A * | 7/1995 | Crumrine | A01K 95/00 43/44.9 |

(Continued)

*Primary Examiner* — Monica L Barlow
*Assistant Examiner* — Aaron M Rodziwicz
(74) *Attorney, Agent, or Firm* — Tucker Law, P.A.; Matthew Sean Tucker, Esq.

(57) ABSTRACT

A tungsten sinker formed of a flat unpainted outer body surface with an inner channel running from a first end to a second end, the tungsten sinker is unpainted, has a flat dark neural color, and includes a base stock of 97% pure tungsten.

13 Claims, 3 Drawing Sheets

(56) References Cited

U.S. PATENT DOCUMENTS

| | | | | |
|---|---|---|---|---|
| 6,145,240 A | * | 11/2000 | Adams | A01K 95/00 43/43.1 |
| 2001/0032412 A1 | * | 10/2001 | Laney | A01K 95/005 43/43.13 |
| 2007/0079542 A1 | * | 4/2007 | Takasaki | A01K 95/00 43/44.9 |
| 2014/0237891 A1 | * | 8/2014 | Donahoe | A01K 95/02 43/44.87 |
| 2015/0089860 A1 | * | 4/2015 | Temple | A01K 95/00 43/43.1 |

* cited by examiner

TUNGSTEN FISHING SINKER AND METHOD THEREOF

CROSS-REFERENCE TO RELATED APPLICATION

This application is related to and claims benefit to U.S. Provisional Patent Application Ser. No. 62/541,754, filed Aug. 6, 2017, entitled TUNGSTEN FISHING SINKER AND METHOD THEREOF, the entirety of which is incorporated herein by reference.

FIELD OF THE INVENTION

The present invention relates to a tungsten fishing sinker, and more particularly to a paint free tungsten fishing sinker formed as paint free with a flat color that reduces line cuts.

BACKGROUND OF THE INVENTION

Fishing sinkers are used when fishing to increase the sink rate of a fish hook. A variety of different weights, sizes, and materials are commonly used in the fishing industry depending on the fishing application. Some of the variety of sinkers may include pyramids, barrels, split-shot, bullets, dipseys, banks, and claw sinkers. For example, a pyramid sinker may be used to anchor on the bottom of a water bed, whereas a bullet sinker may be used for a particular type of fish, such as largemouth bass. Other sinkers are suited for salt water fishing versus fresh water fishing. Yet further, certain sinkers are shaped for casting, whereas other sinkers are shaped for trolling.

Sinkers have been in existence since ancient times in the form of stones, rocks, or bones. Different materials have been used for sinkers based on the chemical composition, resistance to corrosion, and density, which is typically determined based on factors such as cost and fishing application.

Tungsten has become a popular material for fisherman, particularly for freshwater largemouth bass. While the cost of tungsten sinkers exceeds the cost of the previously popular lead sinkers, tungsten sinkers has outpaced lead sinkers due to its environmentally friendlier material and almost twice as dense as lead.

However, existing tungsten sinkers are generally painted and/or formed of a reflective or otherwise shiny surface causing fish distraction. In addition, fisherman commonly paint or marker the surface of sinkers to hide shiny spots. The existing painted and marked sinkers, including tungsten sinkers, cause fishing line fray and/or breakage to the fishing line resulting in the loss of fishing line, sinker, and hooked fish. Yet further, many existing tungsten sinkers are formed with inserts, including those inserts formed of a plastic material, that causes line fray and/or breakage.

Moreover, many fishermen will discard their existing tungsten sinkers when paint wears from the surface because the sinker becomes shiny and/or creates a surface that frays and/or cuts the fishing line.

There is a need in the art for tungsten sinker, and a method for creating the tungsten sinker, that is manufactured with an unpainted but long lasting flat neutral surface color free of inserts or rough surface points.

SUMMARY OF THE INVENTION

The present invention advantageously provides a tungsten sinker for fishing capable of withstanding many fishing casts without changing surface color or developing rough surfaces.

According to an embodiment of the present invention, a principal object is to provide tungsten sinker that is paint free and of a neutral color.

According to an embodiment of the present invention, another object is to provide a black, flat neutral outer surface of the tungsten sinker to avoid shine that distracts fish, therein aiding the fish in engulfing the entire bait and weight for better hookups.

According to an embodiment of the present invention, another object is to provide a tungsten sinker that is free of surfaces that can cut and/or fray fishing line.

Yet another object of the present invention is to provide a tungsten sinker formed having a neutral smell, including due to the neutral color created during the manufacturing process, and therein free of paint and markers commonly used to coat shinny spots on prior sinkers.

Yet another object of the present invention is to provide a tungsten sinker of a neutral color for keeping toothy non-bass game fish from targeting the bait due to sinker shine.

Another object of the present invention is to provide a tungsten sinker heated to between 5800 degrees to 6332 degree that prevents premature shine that can result in an alternate heating process where the heat is less than 5,800 degrees Fahrenheit.

Another object of the present invention, in a nonlimiting embodiment, is to provide a tungsten sinker heated at a temperature less than 5,800 degrees Fahrenheit to cause a color transformation of the tungsten, such heat provided including without limitation with a kiln (typically between 1,000 to 2,700 degrees Fahrenheit), butane (at approximately 2,600 degrees Fahrenheit), propane (at approximately 3,900 degrees Fahrenheit), and/or methane (at approximately 3,500 degrees Fahrenheit), which causes a similar visual effect on the raw tungsten as the high temperature heat source(s), the high temperature heat sources ranging between 5800 to 6332 degrees, but the lower heat sources producing a tungsten product having reduced performance level than the previously provided higher temperature embodiment and processes. The lower heating temperatures susceptible to minor sheen and oxidation effect over time and/or shorter time when compared to the higher temperature heat sources for producing the tungsten sinker.

According to an embodiment of the present invention, an object is to create a tungsten sinker with a flat unpainted exterior surface created by a process comprising the steps of molding a plurality of tungsten fishing sinkers, each of the tungsten fishing sinkers having an inner channel, the tungsten fishing sinker be formed of at least a base stock of 97% pure tungsten, stringing a plurality of tungsten fishing sinkers weighing between 1/16 ounces and 2 ounces, the plurality of tungsten fishing sinkers strung in a tip-to-tip and toe-to-toe alignment, heating in a first pass the tungsten fishing sinkers against an Oxygen/acetylene flame, rotating the tungsten fishing sinkers in relation to the flame until the plurality of tungsten sinkers are completely red visually, removing the tungsten fishing sinkers from the first pass, heating in a second pass the tungsten fishing sinkers against the flame, removing the plurality of tungsten fishing sinkers from the second pass, submerging the tungsten fishing sinkers in a purified ice water bath, sufficiently drying the tungsten fishing sinkers, applying anise oil to an outer surface of the tungsten fishing sinkers, and packaging the tungsten fishing sinkers.

According to an embodiment of the present invention, an object is perform the process relating to the creation of a tungsten sinker with a flat unpainted exterior surface, the process including the steps of molding a plurality of tungsten fishing sinkers, each of the tungsten fishing sinkers having an inner channel, the tungsten fishing sinker be formed of at least a base stock of 97% pure tungsten, stringing a plurality of tungsten fishing sinkers weighing between 1/16 ounces and 2 ounces, the plurality of tungsten fishing sinkers strung in a tip-to-tip and toe-to-toe alignment, heating in a first pass the tungsten fishing sinkers against an Oxygen/acetylene flame, rotating the tungsten fishing sinkers in relation to the flame until the plurality of tungsten sinkers are completely red visually, removing the tungsten fishing sinkers from the first pass, heating in a second pass the tungsten fishing sinkers against the flame, removing the plurality of tungsten fishing sinkers from the second pass, submerging the tungsten fishing sinkers in a purified ice water bath, sufficiently drying the tungsten fishing sinkers, applying anise oil to an outer surface of the tungsten fishing sinkers, and packaging the tungsten fishing sinkers.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
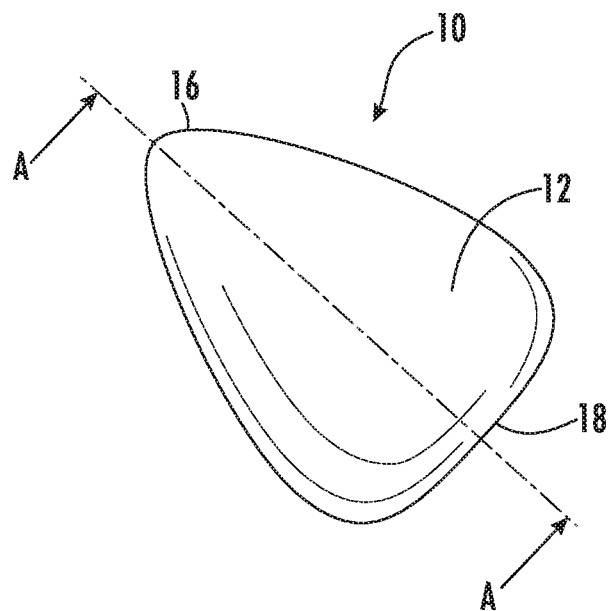
FIG. 1 is a perspective view front of one embodiment of a tungsten fishing sinker in accordance with the principles of the present invention.

The present invention advantageously provides a tungsten sinker, and a method of fabricating a tungsten sinker with a flat neutral unpainted body color.

Accordingly, the tungsten sinker and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 2:
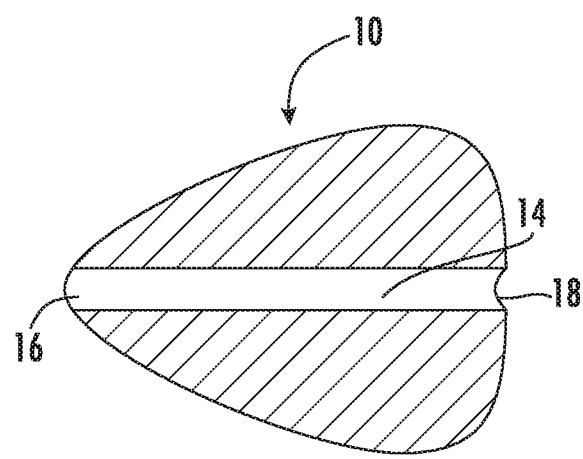
FIG. 2 is a cross-sectional view of the tungsten fishing sinker of FIG. 1 taken along line A-A in accordance with the principles of the present embodiment.

Referring now to the drawings figures in which like reference designators refer to like elements. FIG. 1 and FIG. 2 show an exemplary tungsten sinker constructed in accordance with the principles of the present invention and designated generally as tungsten sinker 10. In particular, the tungsten sinker 10 is formed of a flat unpainted outer body surface 12 with an inner channel 14 running from a first end tip 16 to a second end tail 18. In a non-limiting embodiment, the tungsten sinker 10 will obtain a dark flat neutral color on the outer body surface 12.

The methods described herein relate to forming a tungsten sinker 10 with the outer body surface 12 and the inner channel 14 unpainted and having a flat dark neutral color.

The tungsten sinker 10 may be formed of any conceivable sinker shape.

Figure 3:
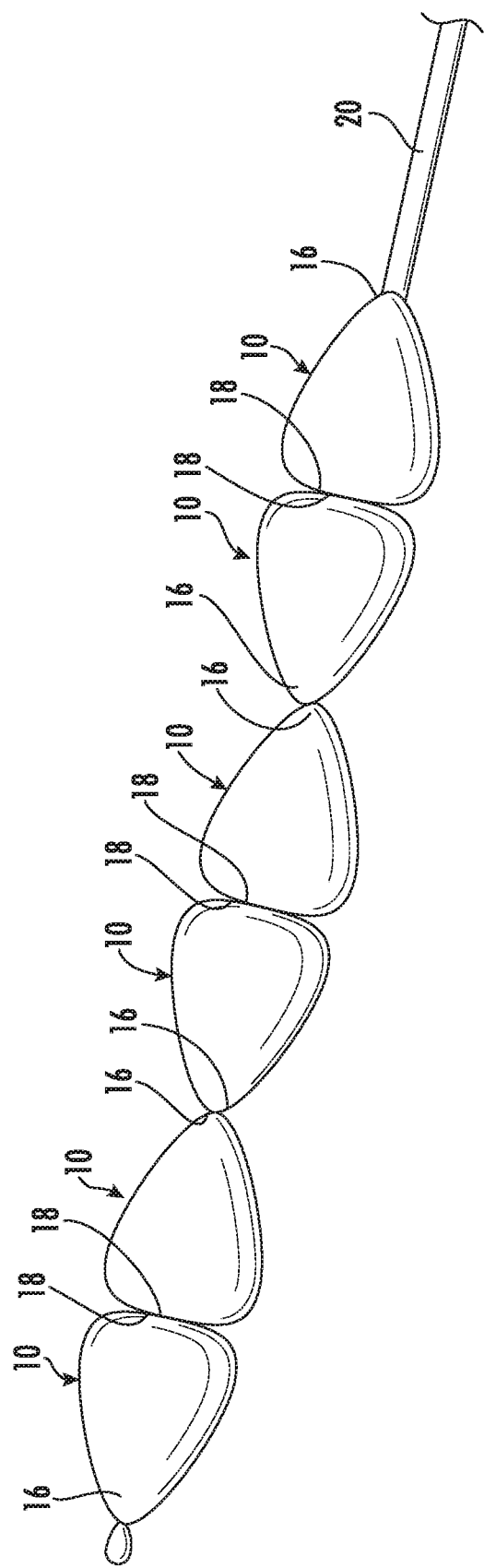
FIG. 3 is a perspective view of multiple tungsten fishing sinkers vertically aligned on a rod in accordance with the principles of the present embodiment.

FIG. 3 provides multiple tungsten sinkers 10 strung tip-to-tip and tail-to-tail in relation to other tungsten sinkers 10 along rod 20.

Figure 4:
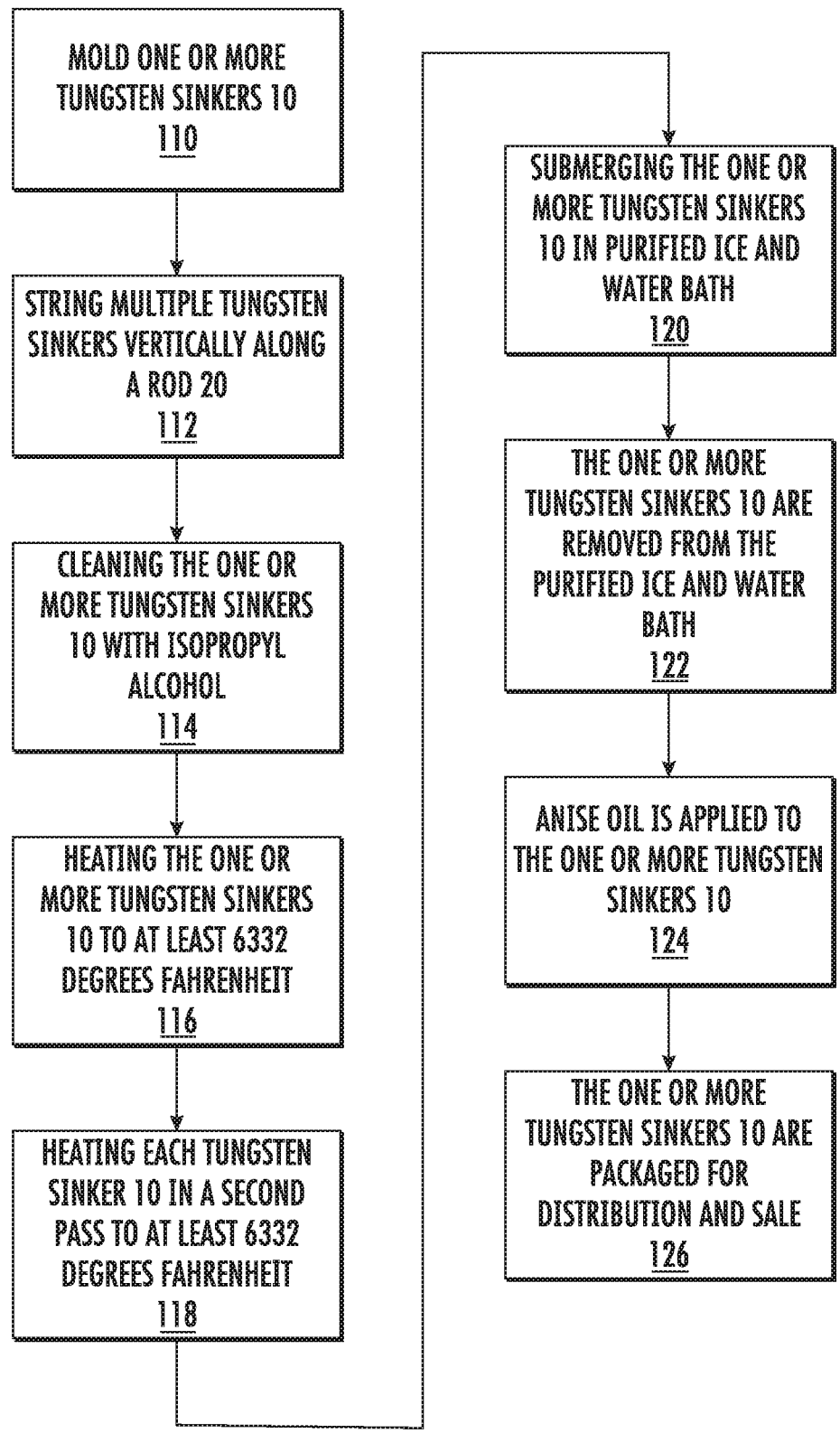
FIG. 4 is a flow chart of an exemplary process for fabricating a tungsten sinker with a flat neutral unpainted body color.

FIG. 4 presents a flow chart showing an overview of the process used in creating a tungsten sinker 10. The process shown in FIG. 4 involves forming a tungsten sinker 10 using a heating process for one or more heating passes at a desired heat and a duration.

At block 110, tungsten is molded into a fishing sinker creating a tungsten sinker 10. The tungsten used in the molding process is at least a base stock of 97% pure tungsten. The resulting tungsten sinker 10 is molded with a shiny plain nonpainted surface ranging in size from 1/16 ounces to 2 ounces.

At block 112, multiple tungsten sinkers 10 are strung (FIG. 3), each weighing at or between 1/16 ounces and 2 ounces, about each inner channel 14 in vertical tip-to-tip and toe-to-toe alignment in relation to the other tungsten sinkers 10 along rod 20. Rod 20 in one non-limiting embodiment is a steal rod, or other rod capable of withstanding extreme heat. Multiple tungsten sinkers 10 are aligned tip 16 to tip 16 and tail 18 to tail 18 of adjacent tungsten sinkers 10 along rod 20 (see FIG. 3).

At block 114, each vertically aligned tungsten sinker 10 is cleaned with isopropyl alcohol. At this block, the vertically aligned tungsten sinkers 10 are soaked and the outer body surface 12 is wiped down.

In one non-limiting embodiment, the tungsten sinker is molded from an at least 97% pure tungsten. The tungsten is optimally ranging in size from 1/16 ounces to two (2) ounces.

At block 116, each vertically aligned tungsten sinker 10 is heated in a first pass against an Oxygen/acetylene flame burning to at or about 6,332 degrees Fahrenheit. The tungsten sinkers 10 are rotated about the rod 20 in relation to the heating element until the tungsten sinkers are completely red visually. In one non-limiting embodiment, each of the vertically aligned tungsten sinkers 10 are heated for at least 30 seconds. In one non-limiting embodiment at block 118, the tungsten sinkers are heated during the first pass to between 5,800 degrees to 6,332 degrees Fahrenheit.

At block 118, each vertically aligned tungsten sinker 10 is heated in a second pass against a high temperature Oxygen/acetylene flame burning to at or about 6,332 degrees Fahrenheit. In one non-limiting embodiment at block 118, the tungsten sinkers are heated during the second pass to between 5,800 degrees to 6,332 degrees Fahrenheit.

At block 120, each tungsten sinker 10 vertically aligned about the rod 20 is entirely submerged in purified ice and water bath at a temperature of at least 32 degrees Fahrenheit or below.

At block 122, the tungsten sinkers 10 are removed from the submerged state contained within purified ice and water bath from block 120. Following the purified ice and water bath, the tungsten sinkers are sufficiently dried once removed from the purified ice and water bath.

At block 124, the tungsten sinkers 10 are applied with anise oil. A shiny sheen on the tungsten sinkers are wiped and flattened out. While anise oil is used, other oils may be utilized in accordance with the spirit and scope of the present invention.

At block 126, the tungsten sinkers 10 are packaged for sale and/or distribution.

In an alternative nonlimiting embodiment, the tungsten sinker 10 is produced with an alternative low heat source, including without limitation kiln heating (1,000 to 2,700 degrees Fahrenheit), butane (approximately 2,600 degrees Fahrenheit), propane (3,900 degrees Fahrenheit), and/or methane (3,500 degrees Fahrenheit). In this embodiment, the tungsten sinker is heated with a temperature less than 5,800 degrees, typically ranging between 1,000 degrees to 3,500 degrees Fahrenheit, causing a transformation of color of the tungsten providing a minor sheen/oxidation effect. Varying the thermodynamics will have effects on oxidation of the tungsten weight producing a tungsten sinker 10 with a reduced sheen when compared against a tungsten sinker 10 created with a high temperature process.

As used herein, when the term "and/or" is used, it shall include all combinations of one or more of the associated described items.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure.

What is claimed is:

1. A tungsten sinker with a flat unpainted exterior surface created by a process comprising the steps of:
   molding a plurality of tungsten fishing sinkers, each of said tungsten fishing sinkers having an inner channel, said tungsten fishing sinker be formed of at least a base stock of 97% pure tungsten;
   stringing a plurality of tungsten fishing sinkers weighing between 1/16 ounces and 2 ounces, said plurality of tungsten fishing sinkers strung in a tip-to-tip and toe-to-toe alignment;
   heating in a first pass said tungsten fishing sinkers against an Oxygen/acetylene flame;
   rotating said tungsten fishing sinkers in relation to said flame until the plurality of tungsten sinkers are completely red visually;
   removing said tungsten fishing sinkers from said first pass;
   heating in a second pass said tungsten fishing sinkers against said flame;
   removing said plurality of tungsten fishing sinkers from said second pass;
   submerging said tungsten fishing sinkers in a purified ice water bath;
   sufficiently drying said tungsten fishing sinkers;
   applying anise oil to an outer surface of said tungsten fishing sinkers; and
   packaging said tungsten fishing sinkers.

2. The process of creating a flat unpainted tungsten sinker, said process comprising:
   molding a tungsten fishing sinker, each of said tungsten fishing sinker having an inner channel and an exterior surface, said tungsten fishing sinker be formed of at least a base stock of 97% pure tungsten;
   heating said tungsten fishing sinker to a sufficient heat for causing said exterior surface to appear flat without an application of paint.

3. The process of creating a flat unpainted tungsten sinker of claim 2, further comprising stringing a plurality of tungsten fishing sinkers weighing between 1/16 ounces and 2 ounces, said plurality of tungsten fishing sinkers strung in a tip-to-tip and toe-to-toe alignment.

4. The process of creating a flat unpainted tungsten sinker of claim 3, further comprising heating in a first pass said tungsten fishing sinkers in a first pass against an Oxygen/acetylene flame.

5. The process of creating a flat unpainted tungsten sinker of claim 4, further comprising rotating said tungsten fishing sinkers in relation to said flame until the plurality of tungsten sinkers are completely red visually.

6. The process of creating a flat unpainted tungsten sinker of claim 5, further comprising removing said tungsten fishing sinkers from said first pass.

7. The process of creating a flat unpainted tungsten sinker of claim 6, further comprising heating in a second pass said tungsten fishing sinkers against said flame.

8. The process of creating a flat unpainted tungsten sinker of claim 7, further comprising removing said plurality of tungsten fishing sinkers from said second pass.

9. The process of creating a flat unpainted tungsten sinker of claim 8, further comprising submerging said tungsten fishing sinkers in a purified ice water bath.

10. The process of creating a flat unpainted tungsten sinker of claim 9, further comprising sufficiently drying said tungsten fishing sinkers.

11. The process of creating a flat unpainted tungsten sinker of claim 10, further comprising applying anise oil to the outer surface of said tungsten fishing sinkers.

12. The process of creating a flat unpainted tungsten sinker of claim 11, further comprising packaging said tungsten fishing sinkers.

13. A tungsten sinker with a flat unpainted exterior surface created by a process comprising the steps of:
   heating in a first pass a plurality of tungsten fishing sinkers against an Oxygen/acetylene flame;
   heating in a second pass said tungsten fishing sinkers against said flame;
   submerging said tungsten fishing sinkers in a purified ice water bath; and
   applying anise oil to the outer surface of said tungsten fishing sinkers.

* * * * *